United States Patent [19]
Nystrom et al.

[11] Patent Number: 5,976,225
[45] Date of Patent: Nov. 2, 1999

[54] METHOD OF RECOVERING PAINT BOOTH FILTERS

[75] Inventors: Ken A. Nystrom, Kent; James Sheppard, Anderson Island, both of Wash.

[73] Assignee: N. S. Technologies, Inc., Steilacoom, Wash.

[21] Appl. No.: 08/872,484

[22] Filed: Jun. 7, 1997

Related U.S. Application Data

[60] Provisional application No. 60/019,253, Jun. 7, 1996.

[51] Int. Cl.⁶ ........................ B01D 29/62; B01D 29/68; B01D 29/56; B01D 35/18
[52] U.S. Cl. .................... 95/278; 95/283; 95/287; 55/282.3; 55/283; 55/291; 55/302; 55/484; 55/485; 55/487; 55/508; 55/525; 55/DIG. 10; 55/DIG. 46
[58] Field of Search .................. 55/282.2, 282.3, 55/284, 285, 286, 287, 291, 351, 353, DIG. 10, DIG. 46, 487, 525, 283, 302, 484, 485, 508; 95/278, 283; 104/89, 93

[56] References Cited

U.S. PATENT DOCUMENTS

| | | | |
|---|---|---|---|
| 2,232,561 | 2/1941 | Richards | 91/60 |
| 2,583,489 | 1/1952 | Meyer | 183/58 |
| 2,658,742 | 11/1953 | Suter et al. | 263/3 |
| 2,788,954 | 4/1957 | Paasche | 261/5 |
| 3,343,519 | 9/1967 | Chapman et al. | 118/314 |
| 3,485,670 | 12/1969 | Fisher | 134/5 |
| 3,554,357 | 1/1971 | Molins et al. | 104/89 |
| 3,880,626 | 4/1975 | Griwatz et al. | 55/525 |
| 3,923,653 | 12/1975 | Lavins | 210/71 |
| 3,930,803 | 1/1976 | Winter | 55/287 |
| 4,235,220 | 11/1980 | Hepner | 126/299 D |
| 4,576,617 | 3/1986 | Renevot | 95/279 |
| 4,608,063 | 8/1986 | Kurokawa | 55/282 |
| 4,684,378 | 8/1987 | Bratten | 55/291 |
| 4,699,896 | 10/1987 | Sing et al. | 264/29.4 |
| 5,103,760 | 4/1992 | Johnson | 118/309 |
| 5,110,747 | 5/1992 | Pataschnick et al. | 436/133 |
| 5,165,969 | 11/1992 | Barlett et al. | 427/421 |
| 5,444,029 | 8/1995 | Martin | 502/38 |
| 5,655,366 | 8/1997 | Kawamura | 60/286 |

FOREIGN PATENT DOCUMENTS 2031311  6/1992  France .................. 55/DIG. 10

Primary Examiner—David A. Simmons
Assistant Examiner—Robert A. Hopkins
Attorney, Agent, or Firm—R. Reams Goodloe, Jr.; Keith D. Gehr

[57] ABSTRACT

A filter frame and media capable of withstanding repeated heating to high temperatures in an oxidizing environment, and a method of cleaning the same for indefinite use in a method of operating industrial paint booths. Progressive density, heat resistant, and preferably metal media paint booth filters are provided for replacement of existing filters in industrial paint booths. The filters are structurally resistant to cyclic heating to high temperature in an oxidizing bake-off oven where the paint residue accumulated on the filters is reduced to ash. After cooling, the ash is removed, and the filters returned to service, and the cycle is repeated. The filter comprises a frame section and a mesh media section which has a plurality of mesh portions. The mesh portions are preferably arranged in a series $M_1$, $M_{n-1}$, $M_n$, wherein n is a positive integer of 4 or more, that are sized with the free face area $A_n$ of each mesh portion n so that the overall mesh media section has a progressive density characteristic. Thus, an excessive amount of material is not captured at the first mesh portion $M_1$ so as to avoid "face blinding" of the filter. In paint booth operation, when the filter has completed its operating cycle, typically as determined by a air flow velocity, dirty filter elements are removed and the filter is heated remove paint residue, and producing ash. After cooling and ash removal, the filter is returned to service.

7 Claims, 6 Drawing Sheets

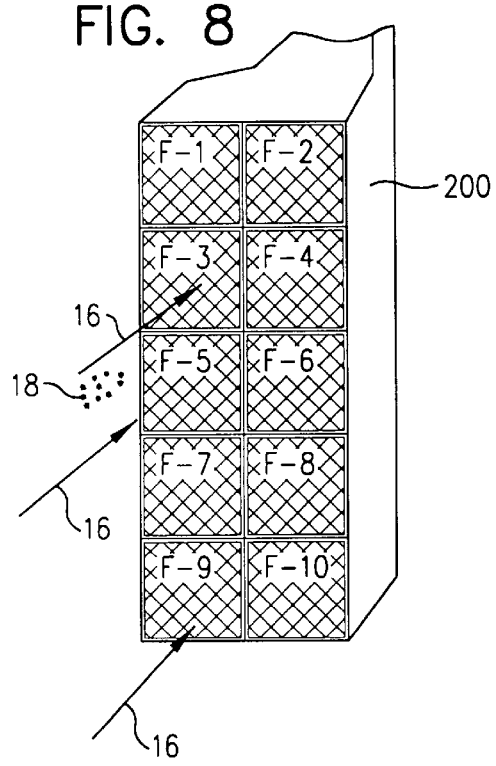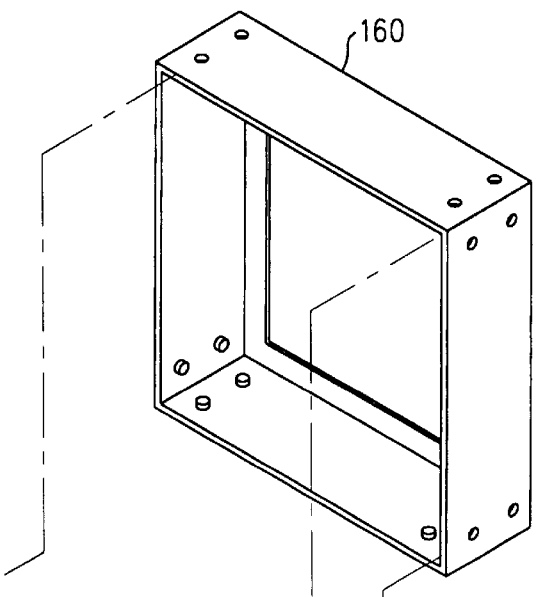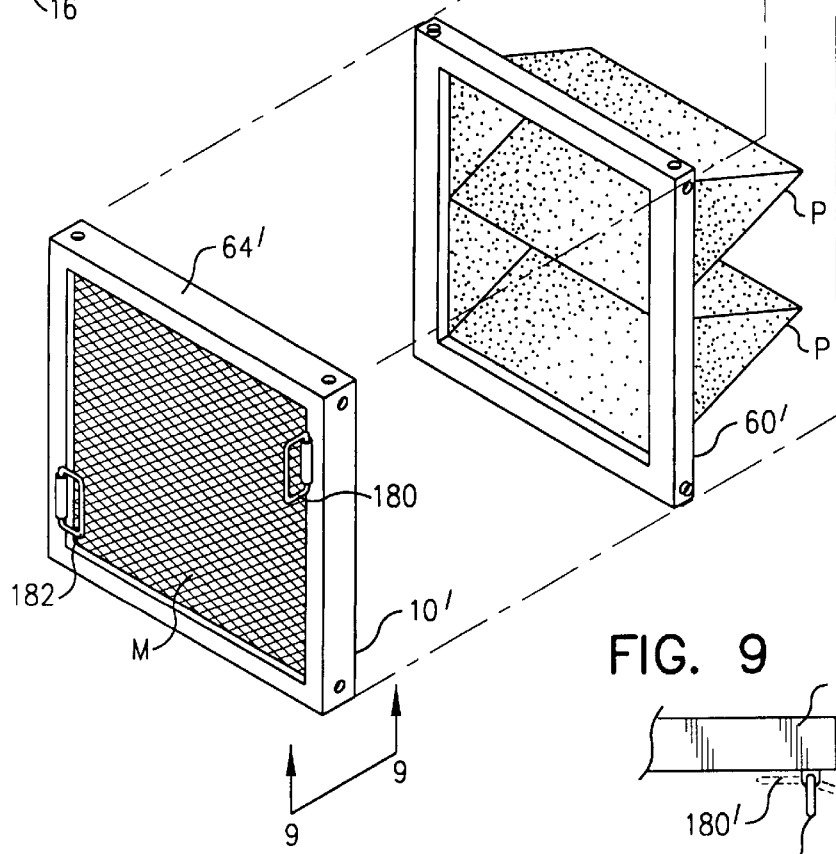

METHOD OF RECOVERING PAINT BOOTH FILTERS

This application claims priority from provisional application Ser. No. 60/019,253, filed Jun. 7, 1996.

TECHNICAL FIELD OF THE INVENTION

This invention relates to novel heat withstanding filters for removing paint overspray particulates from an air stream which is carrying such particulates upon leaving a paint booth, to a method for reusably cleaning such novel filters, and to a method for operating paint booths by use of such filters.

BACKGROUND OF THE INVENTION

In various stages of assembly of various parts and equipment, particularly for large trucks, automobiles, construction machinery, aircraft, or the like, it is often necessary for workers to paint a large object in a containment structure commonly known as a paint booth. Although a variety of paint booth structures have been devised to effectively employ various air flow design characteristics in order to reduce paint booth operating costs while maintaining adequate paint finish quality, in the various prior art paint booth designs known to us, the paint booth operations have resulted in a large quantity of paint contaminated air filters which must be safely and legally handled and discarded. Coating overspray in a typical paint booth might be as much as fifty percent (50%) or more of the volume of coating which adheres to the object being sprayed. With increasingly stringent environmental laws, many paint contaminated filters have had to be handled as hazardous waste, and where such handling is required, a premium has been paid to dispose of such filters in hazardous waste landfills. In particular, the U.S. Environmental Protection Agency, and the environmental agencies in various U.S. states and in other nations, have promulgated regulations and strict standards which require testing and rigorous documentation for land disposal of paint loaded filters which have been produced as a result of paint booth operations.

Collection of overspray paint from a spray booth is generally achieved now by (a) use of paper type filters, (b) use of fiberglass type filters, and (c) use of a water spray curtain for knockout of paint particles to a circulating water bath. Both paper and fiberglass filters result in paint saturated filters which must pass a "paint filter test" showing the absence of free liquids, before being disposed in a landfill. Typically, such filters must be disposed, at relatively high cost, in a hazardous waste landfill. Also, wet spray booth designs result in creation of a sludge, which must be periodically removed, treated, and disposed, often by shipment to a hazardous waste landfill.

In spite of the various schemes which have so far been offered to the marketplace to reduce airflow, limit overspray, or to enhance paint filter life, a continuing and growing demand exists for a simple, inexpensive method which can be used to preserve and enhance the life cycle of paint filters, thus reducing disposal costs. The need for an improved method for paint booth operation is especially seen in conjunction with work where large mobile objects are to be painted, such as heavy haul trucks, rail cars, construction machinery, or large commercial aircraft. As will be evident to those familiar with paint booths and to whom this specification is particularly addressed, a novel filter and a method of using the filter which effectively eliminates the necessity of disposing of large quantities of spent paint filters, would be of great benefit in increasing the profitability of manufacturing plants which are now incurring large and continuing expenses with presently used filters and methods of paint booth operation.

SUMMARY

We have now invented, and disclose herein, a novel, improved heat withstanding filter, and a method for operation of paint booth filtration apparatus, which does not have the above-discussed drawbacks common to operation of those heretofore used paint booths of which we are aware. Our method for paint booth operation employs a novel, progressive density, heat resistant, and preferably metal media paint filter which is sized for direct replacement of existing filters in a paint booth. Our metal media filters are structurally resistant to repeated cycles of high temperature heating, and are simple, compact, relatively inexpensive, not particularly heavy, and easy to install, remove, and reinstall during repeated use. Very simply, these novel metal media filters are quite superior to those superficially similar metal fabric filters which have been employed heretofore by others.

Our recycling method for paint filters differs from prior art practices known to us in that we have developed a filter capable of reliably filtering paint matter, whether liquid or solid, from an airstream, while being capable of reliably and repeatedly withstanding heating to relatively high temperature in an oven, where the residue is oxidized and the solid residual reduced to ash. After combustion and cooling the residual ash is removed, and the filters returned to service. Importantly, the user can return the filters to service in the paint booth again and again, after each cycle of heating, oxidizing the paint in the loaded filter, and then cooling and removing the residual ash therefrom.

Our novel filter is of the type suitable for removal of paint from an airstream passing through the filter. The filter comprises a frame section and a mesh media section. The mesh media section includes a plurality of mesh portions. The mesh portions are preferably arranged in a series $M_1$, $M_2$, $M_3$ through $M_{n-1}$, $M_n$, wherein n is a positive integer, that are sized with the free face area A of each mesh portion n so that the overall mesh media section has a progressive density characteristic. More particularly, a preselected portion of the material in the air entering the first mesh portion $M_1$ can be removed by mesh portion $M_1$, providing a removal efficiency $E_1$, and a preselected portion of the material in the air entering the second mesh portion $M_2$ can be removed, providing a removal efficiency $E_2$. By controlling the free area $A_1$ of first mesh portion $M_1$, and the free area $A_2$ of second mesh portion $M_2$, the capture of particulates can be spread rather evenly along each of the mesh portions $M_1$ through $M_n$. In this manner, an excessive amount of material is not captured at the first mesh portion $M_1$ so as to result in "face blinding" of the filter, that is, a condition where the filter would be effectively plugged by material loading which occurs at the first mesh portion $M_1$ (or perhaps by loading which occurs at the first mesh portion $M_1$ in combination with closely following subsequent mesh portions in the direction of air flow). In the progressive density filter construction technique described, the second mesh portion $M_2$ and subsequent mesh portions through mesh portion $M_n$ are constructed so that material escaping prior mesh portions is removed to by mesh portion $M_n$ of area $A_n$ to an efficiency $E_n$, where the through airstream contamination level is lowered to some additional degree at each successive mesh portion of the mesh section of the filter.

The frame section and the mesh section of the filter are each capable of reliably withstanding heating to and cooling from a temperature sufficiently high to oxidize a preselected coating or paint which has been collected on the surfaces of the frame section and the mesh section of that filter. Also, the frame section and the mesh section are capable of reliably withstanding accumulation of residual ash which is produced when the paint which has been collected is oxidized at high temperature.

Further, we have developed a method for removing paint which has been deposited on paint booth filters, and for returning the filters for further paint removal in the paint booth. The method starts by providing a filter in an operating position in a paint booth, where the filter is of the type comprising a frame section and a mesh section having a plurality of mesh portions $M_1$ through $M_n$, and wherein the frame portion and the mesh section are comprised of a material capable of repeatedly withstanding heating to and cooling from temperatures high enough to a oxidize a paint material deposited thereon. When the filter has completed its operating cycle, typically as determined by a reduced linear velocity which is achievable through the filter that indicates that a desirable upper limit for paint loading on the filter has been reached, then the filter is placed into an oxidizing type oven. The oxidizing type oven is selected to be suitable for heating the filter to a temperature sufficient to oxidize the paint material deposited on the filter. The filter is heated to oxidize the paint residue, to produce a residual ash therefrom. The filter is removed from the oven, and cooled. Before, during, or after the cooling step, the ash residual is removed from the filter, via any convenient mechanical, pneumatic, or hydraulic agitation. Then, the filter is returned to an operating position in the paint booth.

In a further embodiment, the process of recycling the filter can be automated, with the filters located on a conveying system to move the filters from (a) paint booth, to (b) oven, to (c) ash removal system, and (d) thence back to the paint booth for further use in paint removal.

Overall filtration efficiency can be additionally enhanced by using either an integrally mounted additional subsequent or "post filter", or a separately mounted additional or "post filter". Post filters may be of either the flat type or of the pocket type, as suitable for a particular application. Preferably, the post filter is of a high efficiency poly fiber type.

Importantly, our novel filter is durable, and is relatively inexpensive to manufacture.

OBJECTS, ADVANTAGES, AND FEATURES OF THE INVENTION

From the foregoing, it will be apparent to the reader that one important and primary object of the present invention resides in the provision of a novel filter apparatus for removal of paint overspray from an airstream leaving a paint booth, and in the provision of a method of operation for paint booths which employ our novel filters.

Another important objective of the invention is to minimize or eliminate "one-time use" filters paint booth applications, to substantially reduce or eliminate disposal of paint contaminated filters in hazardous waste or other appropriate landfills.

Yet another object of the invention is to reduce operational costs by reducing the need to procure replacements on an on-going basis for "one-time use" paint booth filters.

Other important but more specific objects of the invention reside in the provision of novel filters which:

are highly efficient at removing paint and coating materials;

avoid premature face loading by utilizing a mesh design that provides a gradual, distributed loading of the mesh portions in the filter;

can withstand repeated heating and cooling for oxidative removal of paint or coating which has been deposited on the filter mesh portions and frame portions;

allows replacement of existing filter elements to be done in a simple, quick, direct, manner;

are easy to install and to remove.

Other important objects, features, and additional advantages of our invention will become apparent to the reader from the foregoing and from the appended claims, and as the ensuing detailed description and discussion proceeds in conjunction with the accompanying drawings.

BRIEF DESCRIPTION OF THE DRAWINGS

In the drawings:

FIG. 7 is yet another embodiment of our invention, showing use of our novel recyclable metal filter with a pocket type post filter in a conventional filter frame.

FIG. 8 shows from the exhaust bank of an industrial paint booth where our novel filters were tested.

FIG. 9 is a partial bottom view of the outer frame section of the filter shown in FIG. 7, showing a flexible stainless steel handle attached to our novel filter for ease in installing and removing the filters from filter banks, with alternate positions shown in hidden lines.

DETAILED DESCRIPTION

Figure 1:
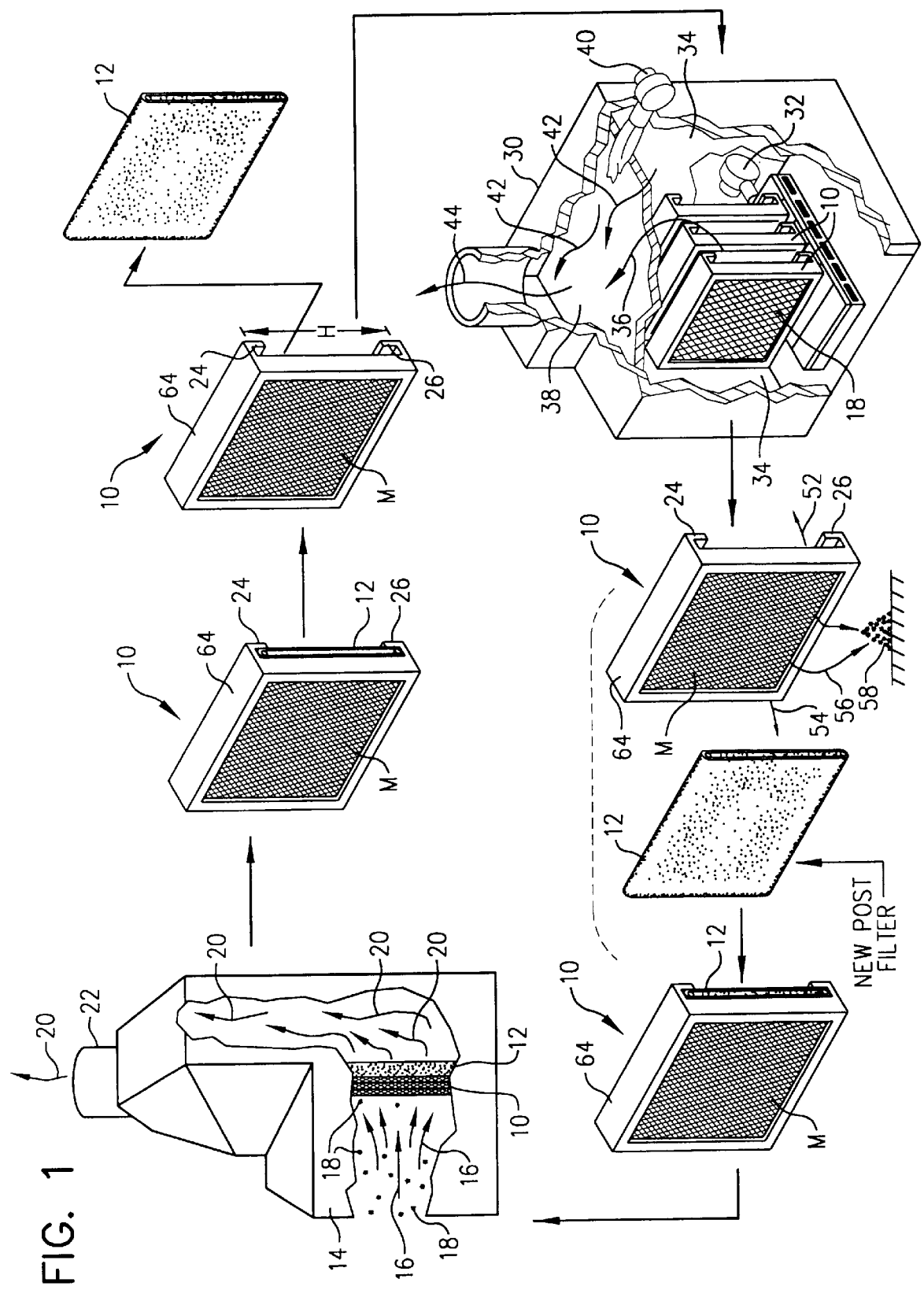
FIG. 1 is a schematic view showing the sequence of events which are encountered while practicing our novel filter recycling process.

Referring now to the drawings, FIG. 1 depicts, in its operative position, a primary filter 10, and as shown here, with integral post filter 12, mounted in the exit plenum 14 for removing an air stream from an industrial paint booth. Air as depicted by reference arrow 16 exits from the paint booth, and the air contains particles 18 of paint overspray which are escaping the paint booth. The air stream 16, containing particles 18, is directed through the filter 10, and then through the optional post filter 12. As a result of this filtering process, it is customary that in excess of ninety five percent (95%) of the mass of the particles 18 are removed, for a ninety five percent removal efficiency. It is more preferable that in excess of ninety nine percent (99%) of the mass of the particles 18 are removed from the air stream 16 passing through the filter. Clean air 20 from which particles 18 have been largely removed escapes from filter 10 and optional filter 12 in the direction of reference arrows indicated, and thence outward through exhaust stack 22.

In the typical paint booth filter plenum 14, filters 10 and optional post filters 12 are left in place until they are "loaded" with a mass of paint being removed from the air stream to such a degree that (a) it can no longer function to an adequate removal efficiency, and/or (b) because the pressure drop (delta P) across the applicable filter(s) becomes excessive, generally as indicated by a remote pressure differential gauge device. Alternately, particularly with experienced operators and with respect to the post filters 12, filters may be changed based on visual appearance at time of an inspection. In any case, primary filter 10 is removed from the exit plenum 14 of the paint booth when it has completed a cycle of service. The optional post filter 12 is here shown provided in an integral fashion with primary filter 10, and is slidably inserted and securely positioned in a slot defined by L-shaped flanges 24 and 26. Such a post filter 12 may also be provided separately (as indicated, for example, in relation to FIG. 7 herebelow), or may be omitted entirely. Typically, the post filter 12 may be provided in a poly or fibrous synthetic construction which is not amenable to recycling. Thus, the post filter 12 is either (a) held for reinsertion into our novel metal filter, after it has been cleaned, recycled and is ready for reuse, if appropriate, or (b) discarded.

After removal from the filtration system, our novel, preferably metal filter 10 is then placed in a "bake-off" or "heat cleaning" type oven 30. The bake oven is operated at a relatively lower initial temperature for a first preselected time period and at a relatively higher final temperature level for a second preselected time period. The length of the first period is from about two to three hours. A typical example of a suitable oven would be the "GO" Series Heat Cleaning Ovens as manufactured by Guspro, Inc., 280 Grand Avenue East, Chatham, Ontario, N7M 5L5, CANADA. In the oven 30, one or more metal filters 10 are heated via primary burner 32 to oxidize contaminants in the process heating chamber 34 (such as paint residue, represented by particles 18 which have become adhered to filters 10). The exact temperatures selected will depend on a variety of factors, including the paint to be oxidized, the local emission regulations, and the oven design itself. In some locales and some ovens, an initial heating period at up to about 260° C., followed by a final heating period at about 343° C., can be used. However, in another locale, it is preferred that oxidation take place at temperatures of up to about 540° C., or more preferably, at temperatures up to about 450° C., and most preferably, at temperatures ranging from approximately 426° C. to approximately 455° C., and to produce combustion gases therefrom as noted by reference arrow 36. With the Guspro type oven 30 design, an oxidizing afterburner chamber 38 is provided, with a separate heating burner 40, to further heat the gases produced in the process chamber up to a final temperature of up to about 877° C. or more, or more preferably, up to about 760° C. Ideally, a long residence time is achieved in the oxidizing after burner chamber for gases traversing therethrough (as represented by reference arrow 42), typically on the order of at least 0.75 seconds at the desired final temperature. The long residence time helps assure that complete oxidation occurs of the volatilized organics, and that stringent pollution control emission requirements are met for the stack gas 44 leaving oven 30.

In one embodiment of the method the filters are weighed when clean and weighed again when loaded with contaminants removed from the air stream. Knowing the weight of contaminants removed, the necessary first period time required in the bake oven can be readily determined.

In our method, the paint adhering to the metal filters 10 is baked until the paint turns to ash. Upon removal of filter 10 from the oven 30, any convenient method, such as manual manipulation of filters (in direction of reference arrows 52 and 54, for example) or by use of a pressurized air hose (not shown), or other pneumatic, hydraulic, or mechanical methods, may be used to remove (reference arrow 56) residual ash 58 from filter 10. Preferably, the ash 58 passes applicable regulatory criteria for disposal as a non-hazardous material. Typically, with U.S. EPA regulations, a non-detect analytical result for volatile organic compounds is required. Also, a toxicity characteristic leaching procedure test (TCLP) is also performed, and the reported leachate contaminant levels must be below hazardous waste listing criteria levels.

Figure 2:
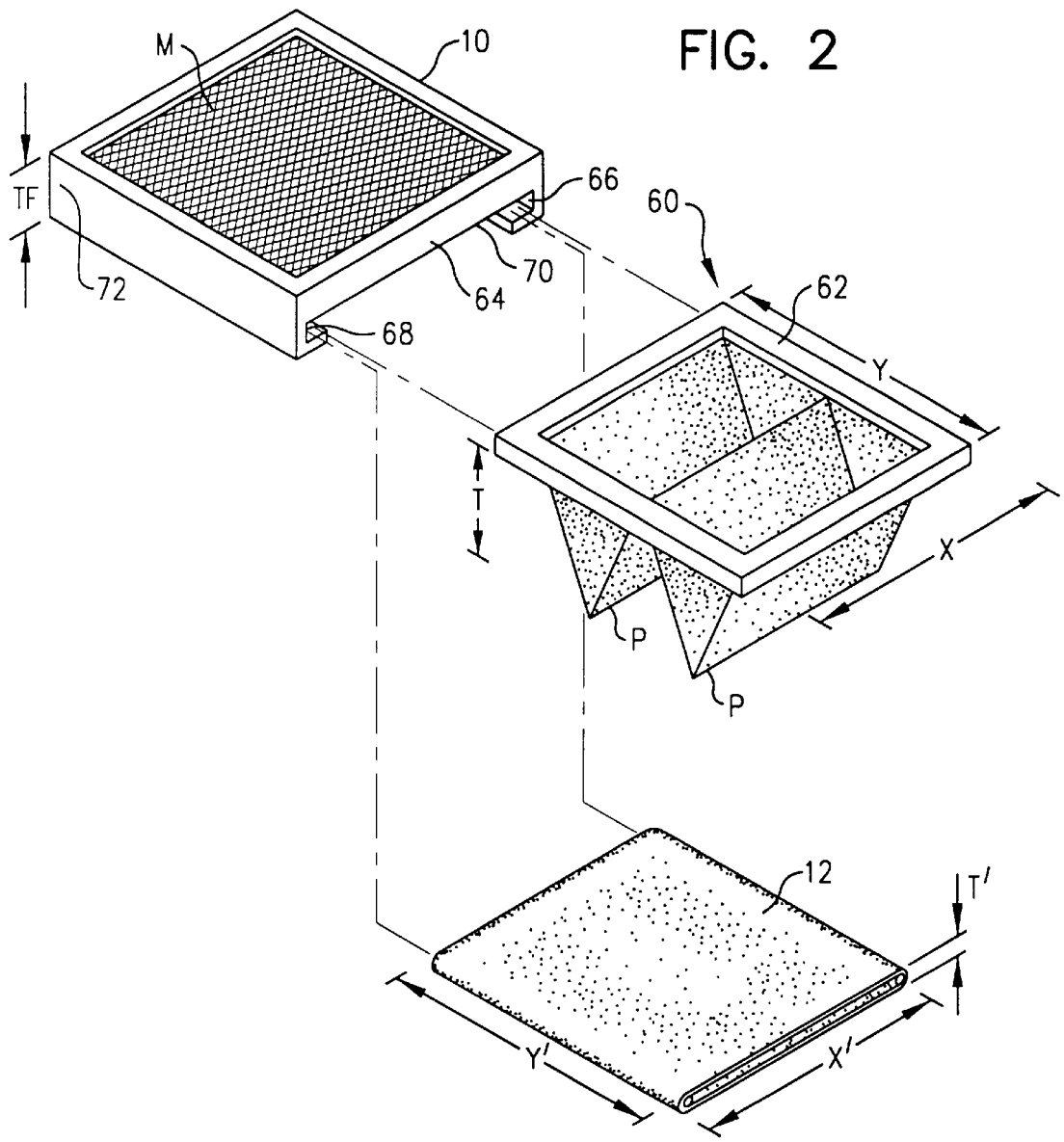
FIG. 2 is a perspective view of one embodiment of our novel filter design, showing a novel metal filter with provision for integral pocket type or flat poly type post filters.

To return the recycled metal filter 10 to service in the paint booth plenum 14, preferably a new post filter 12, is provided, and the recycled filter 10 and new post filter 12 are returned to their operating locations in the paint booth apparatus. Although a flat type post-filter 12 is shown in FIG. 1, a pocket type post filter 60 can also be utilized, as depicted in FIG. 2. Such pocket type post-filters 60 can be selected in dimensions as desired to fit the clearance between L-shaped flange 24 and L-shaped flange 26 clear inside height H as may be provided on a filter 10 of pre-selected size. The pocket filter 60 may have one or more pockets P extending outward in the air flow direction for a total pocket thickness T. The height X of the frame 62 of the pocket filter, and the width Y of the frame 62 of the pocket filter, are adapted to fit in a complementary, close relationship with the outer frame section 64 of recyclable metal filter 10. Likewise, if the flat poly filter 12 is used, its height X' and width Y' are selected to fit in a complementary, close fitting relationship with the inside top 66, inside bottom 68, inside first side 70, and inside second side 72 portions of the post filter attachment L-shaped flanges on outer frame section 64 of recyclable metal filter 10. Overall, the key design feature is that the recyclable metal filter 10 with flanges is designed so that air flow cannot appreciably escape outward between the first, primary filter 10 and the post filter 12 or 60, so as to allow bypass or escapement of particles 18. Rather, air flow 16 is preferably effectively and substantially entirely filtered by both the primary metal filter 10 and the post filter 12 or 60, so as to assure high overall filter efficiencies, i.e. removal efficiencies E in excess of ninety nine percent (99%).

Figure 3:
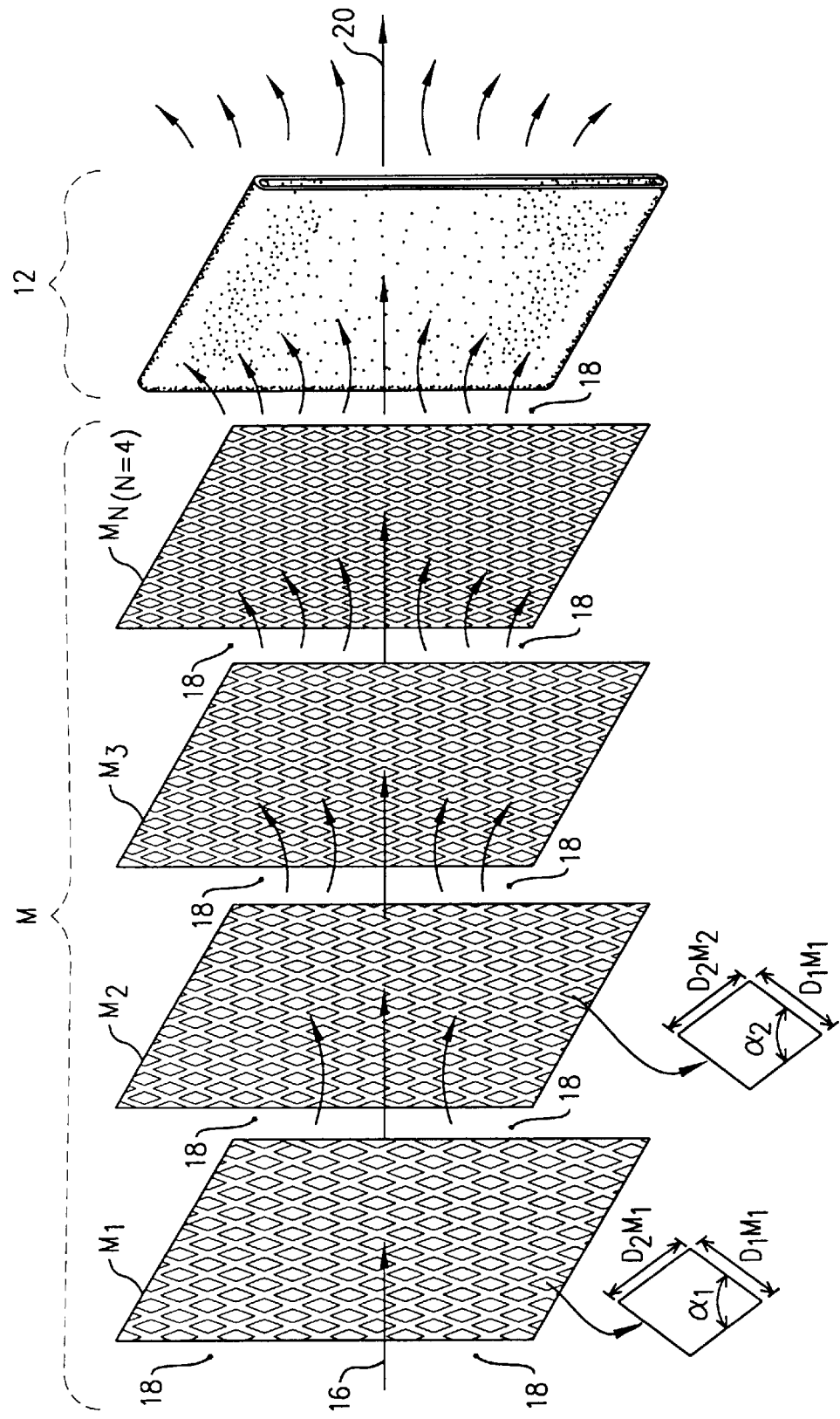
FIG. 3 is an exploded perspective view of an embodiment of our novel filter design, wherein the design sequence for individual filter layers are clearly evident.

Although "metal mesh" filters have been around for some time, our novel metal mesh filter 10 has several novel and improved characteristics over the prior art metal mesh filters known to us. In particular, our filter 10 has an outer frame section 64 and filter media mesh section M which is constructed of a material designed to withstand extreme temperatures, repeatedly, at levels as set forth hereinabove. Preferably, the filter 10 has a metallic outer frame section 64 and a plurality of metal mesh portions in the metallic filter mesh section M. More preferably, stainless steel is used for frame 64 and filter mesh M. Most preferably, both frame 64 and mesh M are provided in 304 type stainless steel. Alternately, a non-metal composite or ceramic material may be provided for frame 64 and filter mesh M, so long as the material will withstand repeated handling and the temperature cycling herein described. Further, our filter 10 has a filter mesh M section which is comprised of two or more, and preferably four or more mesh portions which may be identified as mesh portions $M_1, M_2, \ldots$ to $M_n$. These mesh portions $M_1$ to $M_n$ are preferably each a layer of stainless steel corrugated or expanded metal mesh. These mesh portions occur in at least two layers (n=2), and yet more preferably in at least four layers (n=4). Still more preferably, a plurality of mesh portions M are provided where the number of layers is six or more (n=6). Most preferably, for a frame of one or two inch thickness TF (see FIG. 2), our design comprises seven (7) or eight (8) or more mesh portions, i.e., $M_1$ through $M_8$ (where n=8), or more mesh portions. Each of the mesh portions $M_1$ through $M_8$ or more have a different configuration, as seen in FIG. 3. The first layer may have one configuration, such as a diamond shaped opening of a first dimension $D_1M_1$ by $D_2M_1$ with acute angle alpha$_1$ ($\alpha$), one suitable first dimension would be diamond openings of one-half (0.5) inch by one quarter (0.25) inch. The second layer may have a second configuration with a second dimension $D_1M_2$ by $D_2M_2$, with an acute angle alpha$_2$ ($\alpha$), which might be the same as the first layer $M_1$, or might be slightly smaller. The middle layers, e.g. $M_3$, $M_4$, $M_5$, etc., could be of a pleated or corrugated design with openings in the one-quarter (0.25) inch by one-eighth (0.125) inch size. The final layer, $M_n$, may have openings as small as $D_1M_n$ of one-eighth (0.125) inch by $D_2M_n$ of one-sixteenth (0.0625) inch in size. This design is a "progressive density" type paint collector. The first few mesh layers $M_1$, $M_2$ or so act as a pre-filter to the following layers $M_3$, $M_4$, etc. as may be appropriate for a specific design, based on desired service life, expected paint loading, and other appropriate design parameters. The progressive density design helps prevent face loading of the filters, i.e., avoids capture of most of the particulates on the first one or two layers $M_1$ and $M_2$, and, thereby avoids restricting the air flow so as to cause the later mesh layers, e.g., $M_{n-2}$, $M_{n-1}$, $M_n$, etc. to become ineffective and useless. If the filter were of only three layers $M_1$, $M_2$, and $M_3$, it would be the second and third mesh layers $M_2$ and $M_3$ respectively, that determine the overall efficiency of the filter 10, and the ability of the filter to capture and to hold the paint overspray particulate at low air velocities, such as 100 to 200 feet per minute (fpm), until such time as filter 10 can be removed and reused. For improved efficiency, a synthetic filter media 12 may be used downstream of the mesh section M of filter 10, as depicted in FIG. 3.

Figure 4:
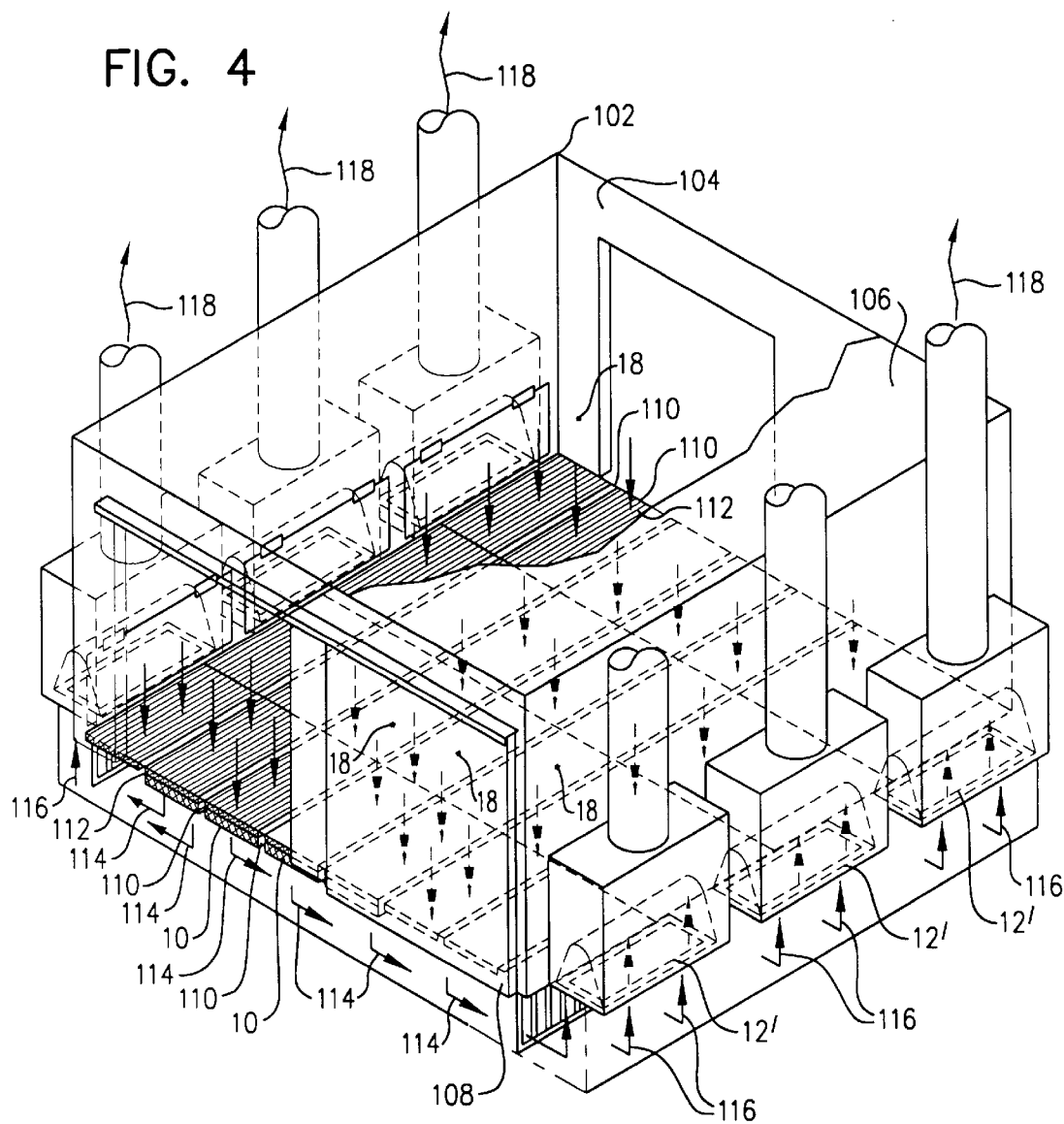
FIG. 4 is perspective view showing how our novel filters may be employed in a typical downflow type industrial paint booth.

Turning now to FIG. 4, use of our novel filters 10 in a typical down-flow type paint booth 102 is depicted. The booth has an enclosing wall 104 and overhead 106, and effectively sealable entrance doors 108. A grate type floor 110 is provided with apertures 112 suitable for large volumes of paint overspray particles 18 carried by airstream 16 to flow downward therethrough and into horizontally mounted metal filters 10 affixed therebelow. Air as indicated by reference arrows 114 leaves filters 10 and proceeds to the perimeter of the booth, where it turns and flows upward (see reference arrows 116) through post filters of any preselected type, such as flat mounted poly filters 12'. The fully filtered air stream thence flows outward and upward in the direction of reference arrows 118.

Figure 5:
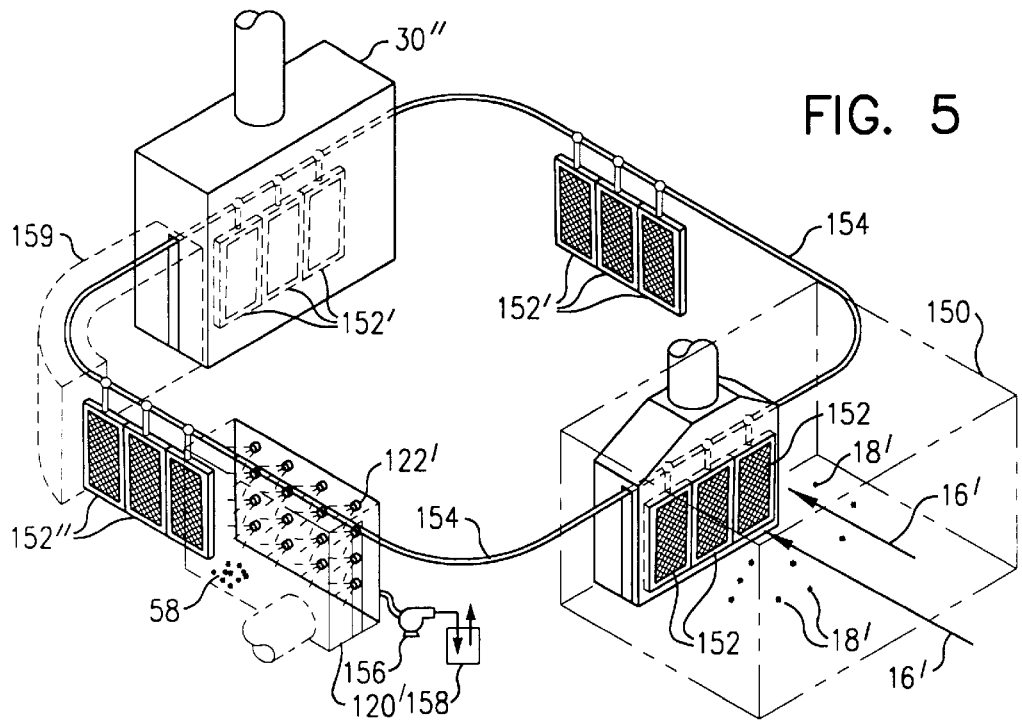
FIG. 5 is a perspective view of an automated method for practicing our paint filter recycling process, as applied to a cross-flow type industrial paint booth structure.
Figure 6:
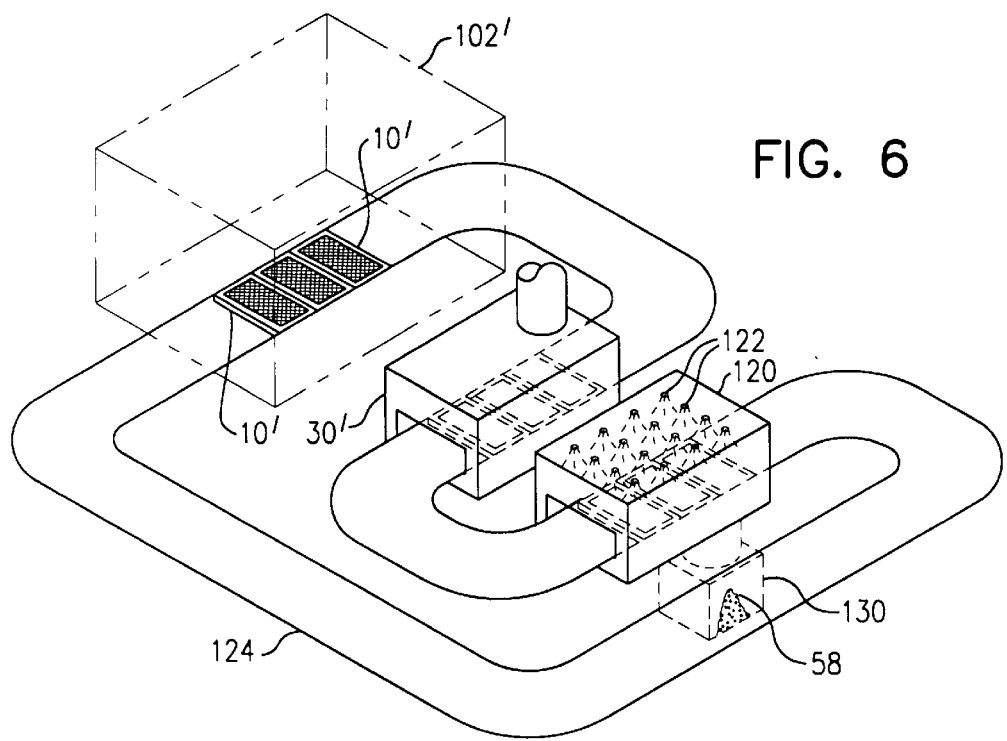
FIG. 6 is a perspective view of an automated method for practicing our paint filter recycling process, as applied to a down-flow type industrial paint booth structure.

Filters 10 may be manually removed from paint booth 102, or, alternately, the process may be automated as depicted in FIGS. 5 and 6. In FIG. 6, the automated process for a typical down-flow paint booth, as just depicted, is illustrated. The booth 102' has filters 10' mounted below the floor grates (not shown) as depicted above. Filters 10', when ready for recycling, are conveyed to bake oven 30' which is closed and fired to remove paint particles from filters 10'. The filters 10' are then moved to an ash handling booth 120, wherein high pressure air jets 122 or other pulsating or vibratory means are used to dislodge ash 58 from filters 10'. Ash 58 is collected in an air pollution control device 130, and the clean filters 10' are then automatically returned along a conveyor track 124 to the booth 102' for reuse.

The same basic principles as just described in reference to FIG. 6 also apply to the cross-flow design shown in FIG. 5. There, a cross-flow paint booth 150 is shown with a bank of filters 152 in place for filtration of particulates 18' leaving booth 150 in airstream 16'. Loaded filters, shown as 152', are transported by conveyance system track 154 to burn-off oven 30". In the burn off oven 30", particles 18' of paint are removed from the recyclable primary heat resistant filters 152. Next, and shown with paint removed as filters 152", the now paint free filters 152' are sent to an ash removal booth 120', wherein high pressure air jets 122' or other pulsating or vibratory means are used to dislodge ash 58 from the paint free but ash laden filters 152". In a still further embodiment, a vacuum system 156 would collect the ash in an enclosed container 158, for disposal of the non-hazardous ash. Upon completion of ash 58 removal, filters 152" have been transformed into clean filters 152 once again, and are conveyed along track 154 to booth 150 for re-use. Ideally, the conveyor system uses an enclosed tunnel (see partial enclosure indicated by hidden lines 159) to completely isolate the filters during their recycle process.

In a common configuration alternative to the configuration initially depicted in FIG. 1 above, a recyclable high temperature resistant and preferably metal filter 10', with outer frame section 64' and mesh section M, may be provided without an integrally mounted post filter. Rather, the pocket type final filter 60' and recyclable metal filter 10' are both independently mounted in support structure frame 160. Also shown in this embodiment are stainless steel handles 180 and 182. As can be seen in FIG. 9, which shows a partial bottom view, taken looking upward at filter 10' of FIG. 7, handle 180 is pivotally mounted to outer frame section 64', so that handle 180 may be repositionably displaced to locations 180' and 180", as necessary for handling. Handle 182 is also preferably pivotally mounted to the outer frame section 64'.

EXAMPLE

An industrial paint booth facility used to paint railroad cars had an exhaust filter bank 200 of ten filter elements, shown as elements F-1 through F-10 in FIG. 8. Four of the ten conventional flat face paper filters were replaced with our novel metal filters, in locations F-7, F-8, F-9, and F-10. The filters were tested by taking velocity readings averaged by taking four readings per filter element. Clean, the conventional paper filter elements had a linear face velocity of less than 200 feet per minute, and actually were found to average from a low of 139 feet per minute in location F-8 to a high of about 190 feet per minute in location F-7. Our novel metal filter elements had an air flow between about 200 feet per minute (197 feet per minute as tested in location F-9) and about 300 feet per minute (296 feet per minute as tested in location F-7), with a desired range of between about 270 feet per minute and about 300 feet per minute. For nominal 24 inch by 24 inch filters, conventional paper filters would need to be changed after two shifts of paint booth operation. Our novel metal filters maintained air flow in excess of 200 feet per minute after five days of two shift per day operation. At that time, our metal filters were removed, and upon weighing the filters, it was determined that our filters had captured approximately six to eight pounds of paint overspray. The paint was removed from the filters by heating in the above described bake-off oven.

It is thus to be appreciated that the novel recyclable metal filter device provided by the present invention, and the method by which filter recycling is possible, thus avoiding hazardous waste production and resulting disposal requirements, is a significant improvement in the state of the art of paint booth operation and maintenance. Our novel filter design, and the method of employing by recycling the same in paint booth operations, is relatively simple, and it substantially improves the cost effectiveness of the paint operations that utilize the same. It will be readily apparent to the reader that our novel, recyclable filter device and the method of using the same in paint filter systems may be easily adapted to other embodiments incorporating the concepts taught herein. Thus, the invention may be embodied in other specific forms without departing from the spirit or essential characteristics thereof. Therefore, the embodiments presented herein are to be considered in all respects as illustrative and not restrictive. All changes and devices which are described within the meaning and range of equivalents of the disclosures set forth herein are therefore intended to be embraced therein.

What is claimed is:

1. A method of reducing the waste stream from an industrial paint booth having an inflow of clean air and an outflow of exhaust air containing paint overspray which comprises:

providing sufficient filters in the paint booth to substantially remove the paint overspray particles carried in the exhaust air stream from the paint spray booth, said filters being of a construction capable of repeatedly withstanding temperatures up to at least about 540° C.;

further providing a bake-off oven having a primary heating chamber and a secondary combustion afterburner;

removing the filters when loaded with captured paint overspray particles from the paint spray booth and placing them in the primary heating chamber of the bakeoff oven;

heating the overspray loaded filters in the primary heating chamber of the oven for a first preselected time period at an initial temperature which does not exceed about 260° C. and then for a second preselected time period at a higher temperature which does not exceed about 343° C. in order to drive off volatile materials and burn off combustible components of the entrapped paint overspray particles so as to leave only exhaust gases and a residual ash on the filters;

directing the exhaust gases from the primary heating chamber into a secondary afterburner at a temperature of at least about 760° C. to ensure essentially complete oxidation of any volatilized organic components in said gases;

removing any remaining residual ash from the filters; and returning the cleaned filters for reuse in the paint spray booth, whereby the only waste stream for subsequent disposal is the removed ash.

2. The method of claim 1 in which the filter is a progressive type comprising a frame section and a mesh section, said mesh section comprising a plurality of mesh portions in a series of mesh portions $M_1$, $M_2$, $M_3$ through $M_n$, where n is a positive integer of four or larger and each succeeding mesh portion has smaller openings than the one preceding it, said frame section and said mesh section each comprised of a material capable of repeatedly withstanding heating to and cooling from temperatures high enough to oxidize a load of paint deposited on said filter.

3. The method of claim 2 in which the mesh portions have openings in a diamond shaped configuration.

4. The method of claim 1 in which the first heating period is from about 2 to 3 hours.

5. The method of claim 1 wherein the filters are suspended from a transport track and the overspray loaded filters are moved on the track from the paint booth to and through the bake oven and returned to the paint booth for reuse.

6. The method of claim 1 in which the ash is removed pneumatically.

7. The method of claim 1 in which the ash is removed by vacuum.

* * * * *